(12) United States Patent
Yoon et al.

(10) Patent No.: US 12,441,557 B2
(45) Date of Patent: Oct. 14, 2025

(54) APPARATUS AND METHOD FOR TRANSPORTING ARTICLES

(71) Applicant: SEMES CO., LTD., Chungcheongnam-do (KR)

(72) Inventors: Eun Sang Yoon, Gyeonggi-do (KR); Seung Keun Jun, Gyeonggi-do (KR); Hyi Jae Kang, Seoul (KR)

(73) Assignee: SEMES CO., LTD., Chungcheongnam-do (KR)

( * ) Notice: Subject to any disclaimer, the term of this patent is extended or adjusted under 35 U.S.C. 154(b) by 180 days.

(21) Appl. No.: 18/073,723

(22) Filed: Dec. 2, 2022

(65) Prior Publication Data
US 2023/0211963 A1 Jul. 6, 2023

(30) Foreign Application Priority Data

Dec. 30, 2021 (KR) .................. 10-2021-0193243
May 27, 2022 (KR) .................. 10-2022-0065102

(51) Int. Cl.
*B65G 49/06* (2006.01)
*B65G 1/04* (2006.01)

(52) U.S. Cl.
CPC ......... *B65G 49/067* (2013.01); *B65G 1/0407* (2013.01); *B65G 49/061* (2013.01); *B65G 49/062* (2013.01); *B65G 2201/0297* (2013.01)

(58) Field of Classification Search
CPC .. B65G 49/067; B65G 1/0407; B65G 49/061; B65G 49/062; B65G 2201/0297;
(Continued)

(56) References Cited

U.S. PATENT DOCUMENTS 9,056,718 B2 * 6/2015 Ito .................. B65G 1/0407
2008/0069672 A1 * 3/2008 Ikehata ............. H01L 21/67769
414/800
(Continued)

FOREIGN PATENT DOCUMENTS

JP 2011-71434 4/2011
JP 2011071434 A * 4/2011
(Continued)

OTHER PUBLICATIONS

Office Action dated Nov. 21, 2023 for Korean Patent Application No. 10-2022-0065102 and its English translation from Global Dossier.
(Continued)

*Primary Examiner* — Gene O Crawford
*Assistant Examiner* — Abby A Jorgensen
(74) *Attorney, Agent, or Firm* — WOMBLE BOND DICKINSON (US) LLP

(57) ABSTRACT

Provided is an apparatus for transporting articles that can effectively treat numerous articles. The apparatus for transporting articles comprises: a frame; a first transport mounting portion connected to the frame and configured to support a first-class article from below; a second transport mounting portion connected to the frame, disposed over the first transport mounting portion and configured to support the first-class article from below; a third transport mounting portion connected to the frame, disposed over the second transport mounting portion and configured to support a second-class article different from the first-class article from below. The first transport mounting portion operates independently of the second and third transport mounting portions, and the second transport mounting portion and the third transport mounting portion operate simultaneously.

20 Claims, 11 Drawing Sheets

(58) Field of Classification Search
CPC  B65G 2249/02; B65G 49/063; B65G 47/901;
B65G 2201/0235; H01L 21/6773; H01L
21/67769; H01L 21/67775; H01L
21/67766; H01L 21/67706; H01L
21/67727; H01L 21/67742
See application file for complete search history.

(56)  References Cited

U.S. PATENT DOCUMENTS

| | | | | |
|---|---|---|---|---|
| 2009/0196715 | A1* | 8/2009 | Rebstock | H01L 21/67769 |
| | | | | 414/222.01 |
| 2014/0056672 | A1* | 2/2014 | Mathys | B65G 1/0407 |
| | | | | 414/277 |
| 2017/0183156 | A1* | 6/2017 | Yoshioka | H01L 21/67736 |
| 2017/0338139 | A1* | 11/2017 | Rebstock | H01L 21/67769 |
| 2019/0344978 | A1* | 11/2019 | Jun | H01L 21/6773 |

FOREIGN PATENT DOCUMENTS

| | | | | | |
|---|---|---|---|---|---|
| JP | 2017-195279 | | 10/2017 | | |
| JP | 2017195279 | A * | 10/2017 | | |
| JP | 2021-178712 | | 11/2021 | | |
| JP | 2021178712 | A * | 11/2021 | | B65G 1/04 |
| KR | 806250 | B1 * | 2/2008 | | |
| KR | 2016015493 | A * | 2/2016 | | |
| KR | 20160056826 | A * | 5/2016 | | B65G 1/0407 |
| KR | 10-2018-0034222 | | 4/2018 | | |
| KR | 10-2019-0125181 | | 11/2019 | | |
| KR | 10-2076630 | | 2/2020 | | |
| KR | 20200079031 | A * | 7/2020 | | B65G 47/901 |
| KR | 10-2021-0032905 | | 3/2021 | | |
| KR | 10-2021-0139147 | | 11/2021 | | |
| TW | 1462861 | B * | 12/2014 | | B65G 1/0407 |
| WO | WO-2007051070 | A2 * | 5/2007 | | H01L 21/67769 |
| WO | WO-2008047778 | A1 * | 4/2008 | | B65G 1/0407 |

OTHER PUBLICATIONS

Office Action dated Jan. 9, 2024 for Japanese Patent Application No. 2022-206293 and its English machine translation by Google Translate.

Notice of Allowance dated Jul. 5, 2024 for Korean Patent Application No. 10-2022-0065102 and its English translation from Global Dossier.

* cited by examiner

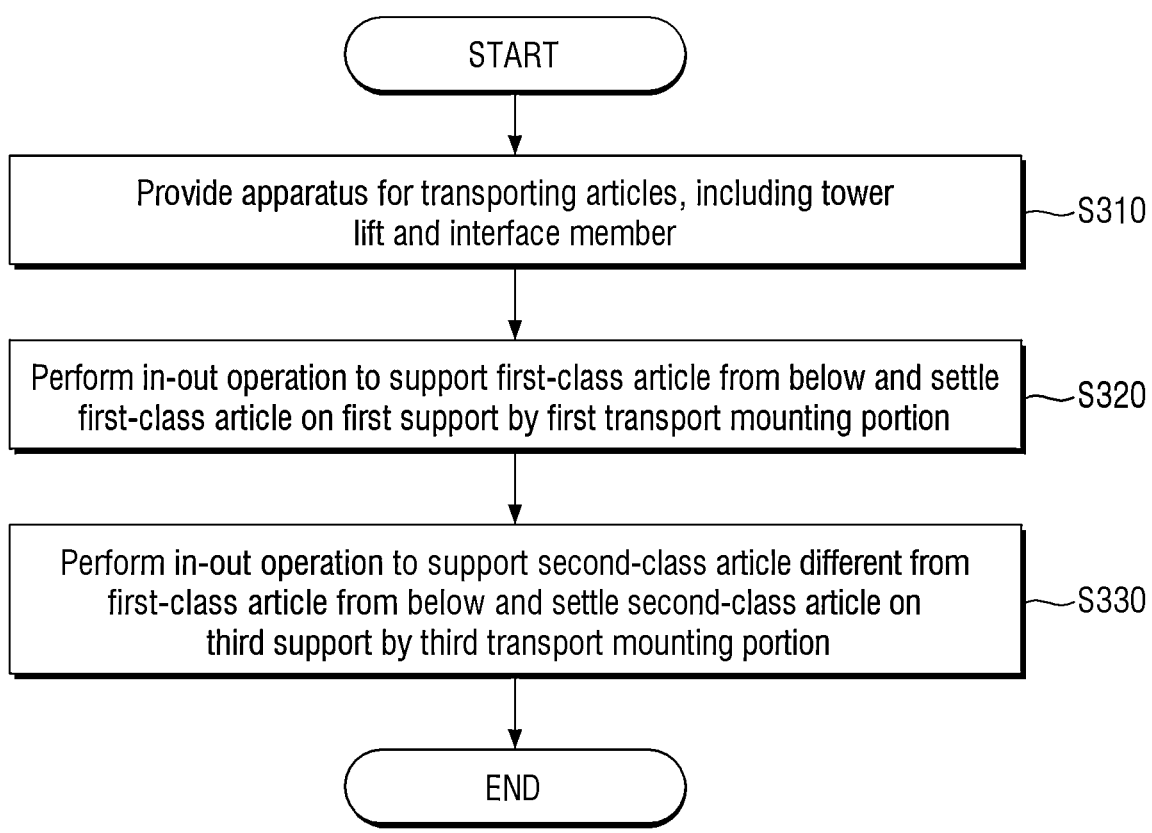

APPARATUS AND METHOD FOR TRANSPORTING ARTICLES

CROSS-REFERENCE TO RELATED APPLICATION

This application claims priority from Korean Patent Application No. 10-2021-0193243 filed on Dec. 30, 2021 and No. 10-2022-0065102 filed on May 27, 2022 in the Korean Intellectual Property Office, and all the benefits accruing therefrom under 35 U.S.C. 119, the contents of which in its entirety are herein incorporated by reference.

BACKGROUND

1. Technical Field

The present disclosure relates to an apparatus and method for transporting articles.

2. Description of the Related Art

In a semiconductor factory, articles (e.g., a wafer storage container and a reticle storage container) are moved by an automatic transport system. The automatic transport system includes, for example, an overhead hoist transport (OHT) and an overhead shuttle (OHS).

SUMMARY

Meanwhile, in order to move a transported article between layers, a tower lifter is used. However, since the transported article has to be moved from a transport vehicle such as the OHT to the tower lifter, there is some waiting time before loading the transported article to the tower lifter. Therefore, numerous transported articles are concentrated in the tower lifter area.

Aspects of the present disclosure provide an apparatus for transporting articles that can effectively treat numerous articles.

Aspects of the present disclosure also provide a method for transporting articles that can effectively treat numerous articles.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

Technical Solution

According to an aspect of the present disclosure, there is provided an apparatus for transporting articles comprising: a frame; a first transport mounting portion connected to the frame and configured to support a first-class article from below; a second transport mounting portion connected to the frame, disposed over the first transport mounting portion and configured to support the first-class article from below; a third transport mounting portion connected to the frame, disposed over the second transport mounting portion and configured to support a second-class article different from the first-class article from below. The first transport mounting portion operates independently of the second and third transport mounting portions, and the second transport mounting portion and the third transport mounting portion operate simultaneously.

According to another aspect of the present disclosure, there is provided an apparatus for transporting articles comprising: a tower lifter configured to transport the article; an interface member configured to receive the article from the tower lifter and store the article or transport the article to another position. The tower lifter comprises: a frame configured to move in the vertical direction; a robot arm connected to the frame; a first transport mounting portion connected to the robot arm and configured to support a first-class article from below; and a second transport mounting portion connected to the robot arm, disposed over the first transport mounting portion and configured to support a second-class article different from the first-class article from below. When viewed in the vertical direction, the first transport mounting portion and the second transport mounting portion are installed to overlap with each other, and the first transport mounting portion and the second transport mounting portion operate simultaneously according to the operation of the robot arm.

According to an aspect of the present disclosure, there is also provided a method for transporting articles comprising: providing an apparatus for transporting articles, wherein the apparatus comprises a frame, a first transport mounting portion connected to the frame and configured to support a first-class article from below, a second transport mounting portion connected to the frame, disposed over the first transport mounting portion and configured to support the first-class article from below, and a third transport mounting portion connected to the frame, disposed over the second transport mounting portion and configured to support a second-class article different from the first-class article from below, and further comprises a tower lift configured to simultaneously operate the first transport mounting portion and the second transport mounting portion and an interface member including a first support, a second support and a third support; performing an in-out operation to support the first-class article from below and settle the first-class article on the first support by the first transport mounting portion; and performing the in-out operation to support the second-class article different from the first-class article from below and settle the second-class article on the third support by the third transport mounting portion.

Specific details of other embodiments are included in the detailed description and the drawings.

BRIEF DESCRIPTION OF THE DRAWINGS

The above and other aspects and features of the present disclosure will become more apparent by describing in detail exemplary embodiments thereof with reference to the attached drawings, in which:

FIG. 11 is a flowchart explaining a method for transporting articles according to some embodiments of the present disclosure.

DETAILED DESCRIPTION OF THE EMBODIMENTS

Figure 1:
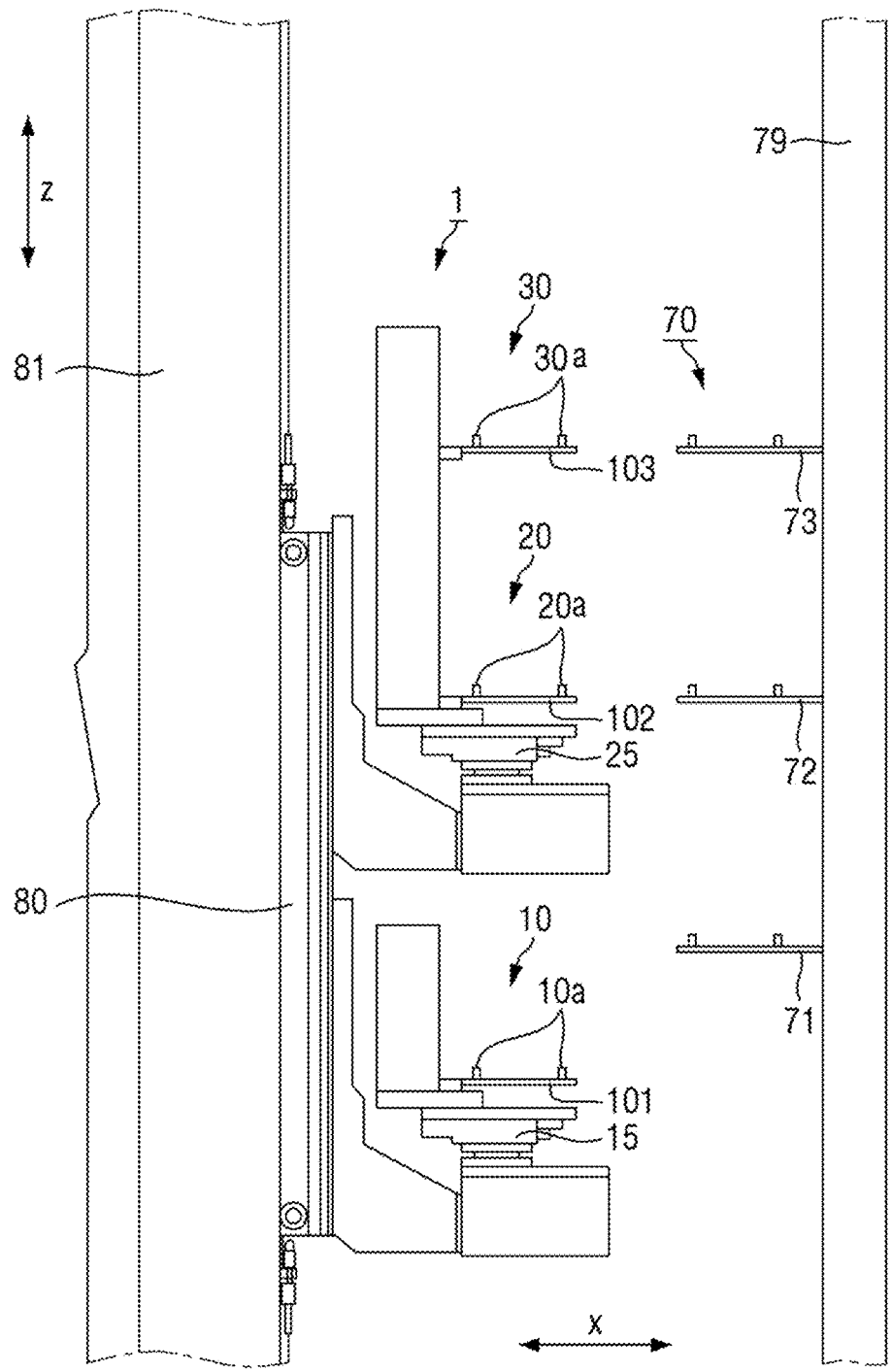
FIG. 1 is a view explaining an apparatus for transporting articles according to some embodiments of the present disclosure.

Hereinafter, embodiments of the present disclosure will be described with reference to the attached drawings. The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. Like numbers refer to like elements throughout the description of the figures.

The spatially relative terms "below", "beneath", "lower", "above", and "upper" may be used to easily describe the correlation of a device or constructions with other devices or constructions. Spatially relative terms are to be understood as including terms in different directions of the device in use or operation in addition to the directions shown in the figures. For example, when flipping a device shown in the figure, a device described as "below" or "beneath" of another device may be placed "above" of another device. Thus, the exemplary term "below" can encompass both an orientation of above and below. The device can also be oriented in other directions, so that spatially relative terms can be interpreted according to orientation.

Although the first, second, etc. are used to describe various elements, constructions and/or sections, these elements, constructions and/or sections are of course not limited by these terms. These terms are only used to distinguish one element, construction or section from another element, construction or section. Therefore, the first device, the first construction, or the first section mentioned below may be a second device, a second construction, or a second section within the technical spirit of the present disclosure.

Hereinafter, preferred embodiments according to the present disclosure are described in detail with reference to the accompanying drawings. The same or similar elements are assigned the same reference numerals irrespective of their reference numerals, and a redundant description thereof is omitted.

FIG. 1 is a view explaining an apparatus for transporting articles according to some embodiments of the present disclosure.

Referring to FIG. 1, the apparatus for transporting articles according to some embodiments of the present disclosure includes a tower lifter 1 and an interface member 70.

The tower lifter 1 moves the article in an up-and-down direction (or a vertical direction) (see reference numeral z-direction). The tower lifter 1 includes a guide rail 81 extending in the vertical direction and a frame 80 moving along the guide rail 81.

In addition, the frame 80 is equipped with a first robot arm 15, a second robot arm 25, a first transport mounting portion 10, a second transport mounting portion 20, and a third transport mounting portion 30.

Specifically, each of the first robot arm 15 and the second robot arm 25 may perform an in-out operation. In other words, each of the first robot arm 15 and the second robot arm 25 may perform a projecting operation and a withdrawing operation. To implement such operations, each of the first robot arm 15 and the second robot arm 25 may have a link type capable of bending and stretching operations, but the present disclosure is not limited thereto. Any movable or deformable configuration to pick up articles may be used.

The first transport mounting portion 10 is installed on one end (e.g., a last link) of the first robot arm 15. The first transport mounting portion 10 may advance or retreat according to a bending/stretching operation of the first robot arm 15 (see reference numeral x-direction). The first transport mounting portion 10 includes a first transport plate 101 and a plurality of first positioning pins 10a. The first transport plate 101 may be installed on the last link of the first robot arm 15, and a first-class article may be settled on the first transport plate 101. The first transport plate 101 supports the first-class article from below. The plurality of first positioning pins 10a are meant to stably fix the article and may fit in a first engagement groove installed on a bottom surface of the first-class article.

The second transport mounting portion 20 and the third transport mounting portion 30 are connected to one end (e.g., the last link) of the second robot arm 25. The second transport mounting portion 20 and the third transport mounting portion 30 may advance or retreat according to a bending/stretching operation of the second robot arm 25 (see drawing reference numeral x-direction).

The second transport mounting portion 20 includes a second transport plate 102 and a plurality of second positioning pins 20a. The second transport plate 102 may be connected to the last link of the second robot arm 25, and the first-class article may be settled on the second transport plate 102. The second transport plate 102 supports the first-class article from below. The plurality of second positioning pins 20a are meant to stably fix the first-class article and may fit in the first engagement groove installed on the bottom surface of the first-class article.

The third transport mounting portion 30 includes a third transport plate 103 and a plurality of third positioning pins 30a. The third transport plate 103 may be connected to the last link of the second robot arm 25, and a second-class article may be settled on the third transport plate 103. The third transport plate 103 supports the second-class article from below. The plurality of third positioning pins 30a are meant to stably fix the second-class article and may fit in the second engagement groove installed on a bottom surface of the second-class article.

Meanwhile, the first-class article and the second-class article are different types of articles. The first-class article and the second-class article may be containers for moving different types of members, and, accordingly, may have different shapes or sizes.

For example, the first-class article may be a wafer storage container. An example of a wafer storage container may be a front opening unified pod (FOUP), but the present disclosure is not limited thereto. The second-class article may be a reticle storage container. An example of the reticle storage container may be POD, but the present disclosure is not limited thereto. In that case, the height of the first-class article may be higher than that of the second-class article.

The first transport mounting portion 10, the second transport mounting portion 20, and the third transport mounting portion 30 are installed to overlap with each other when viewed in the extending direction of the frame 80 (i.e., the vertical direction (z-direction)).

On the other hand, the first robot arm 15 is equipped with the first transport mounting portion 10, and the second robot arm 25 is equipped with the second and third transport mounting portions 20 and 30; therefore, the first transport mounting portion 10 operates independently of the second and third transport mounting portions 20 and 30, and the second and third transport mounting portions 20 and 30 operate simultaneously. In other words, the first transport mounting portion 10 moves in the x-direction according to the bending/stretching operation of the first robot arm 15, and the second and third transport mounting portions 20 and 30 move in the x-direction according to the bending/stretching operation of the second robot arm 25. When the second transport mounting portion 20 moves, the third transport mounting portion 30 moves along.

In addition, as described above, the first transport mounting portion 10 and the second transport mounting portion 20 support the first-class article from below, and the third transport mounting portion 30 supports the second-class article from below. Therefore, the first to third transport mounting portions 10, 20 and 30 can stably and quickly move the container as compared to holding and moving a lid of the container. When the container is moved while holding its lid, it has to be moved slowly, as objects in the container can easily shake. However, when the container is moved while supporting the bottom surface of the container, the container can be moved faster, as the object in the container does not shake easily. As a result, since the first to third transport mounting portions 10, 20 and 30 support the first-class/second-class articles from below, the first-class/second-class articles move at a constant speed regardless of the type of articles. In other words, the moving speed of the first transport mounting portion 10 may be substantially identical to the moving speed of the second/third transport mounting portions 20 and 30.

The detailed operations of the first transport mounting portion 10, the second transport mounting portion 20, and the third transport mounting portion 30 will be described below with reference to FIGS. 2, 5, 6, and 7.

The interface member 70 includes a plurality of supports 71, 72 and 73. For example, the plurality of supports 71, 72 and 73 may be disposed in the vertical direction (see reference numeral z-direction), but the present disclosure is not limited thereto. The first support 71 and the second support 72 may be regions for supporting the first-class article, and the third support 73 may be a region for supporting the second-class article, but the present disclosure is not limited thereto. The plurality of supports 71, 72 and 73 may be installed on a pillar 79, but the present disclosure is not limited thereto.

The interface member 70 may be a storage device configured to store the first-class articles or the second-class articles, or a conveyor device configured to transport the first-class articles or second-class articles, but the present disclosure is not limited thereto.

Figure 2:
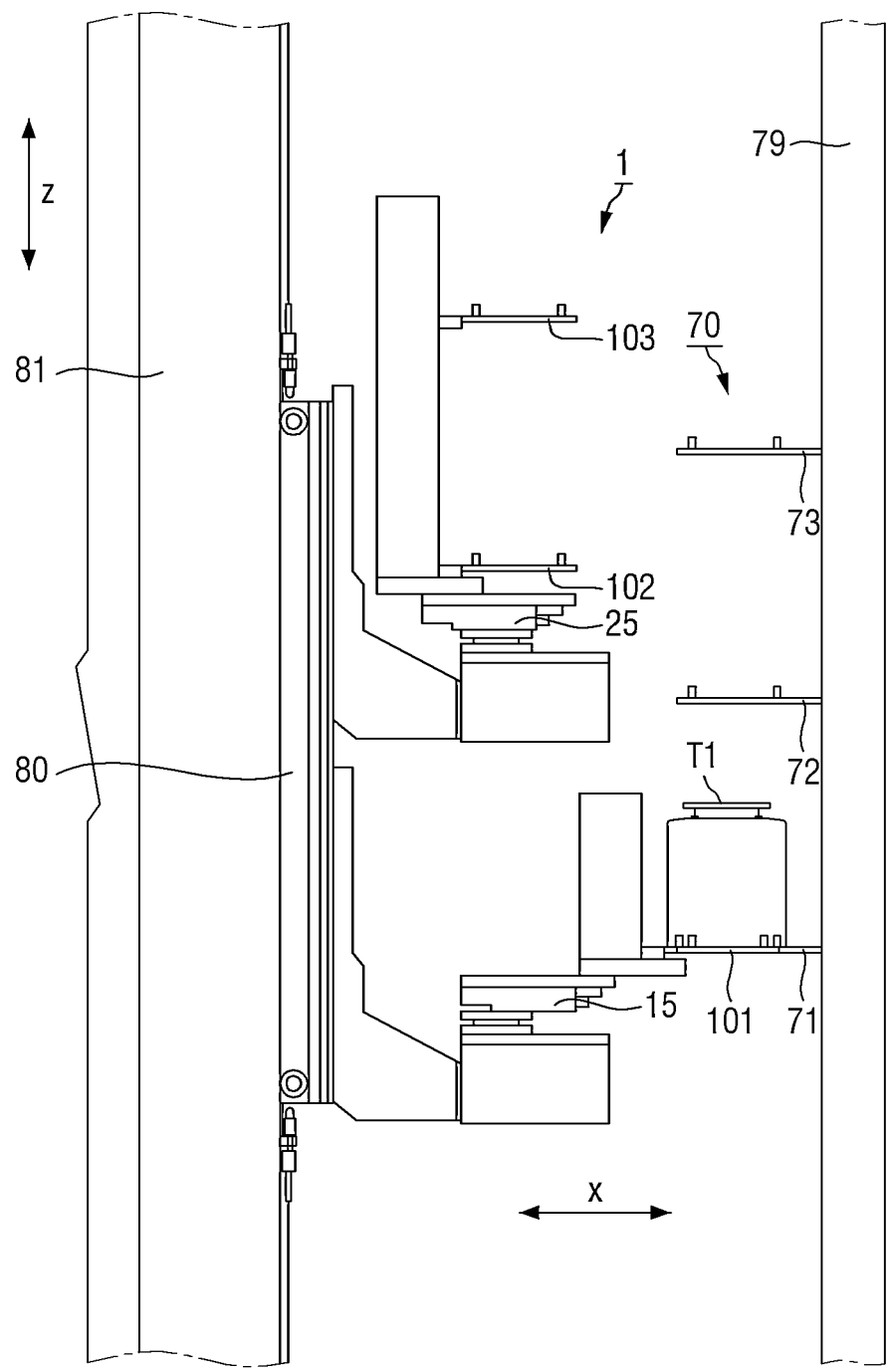
FIG. 2 is a view explaining an operation of a first transport mounting portion of a tower lifter of FIG. 1.
Figure 3:
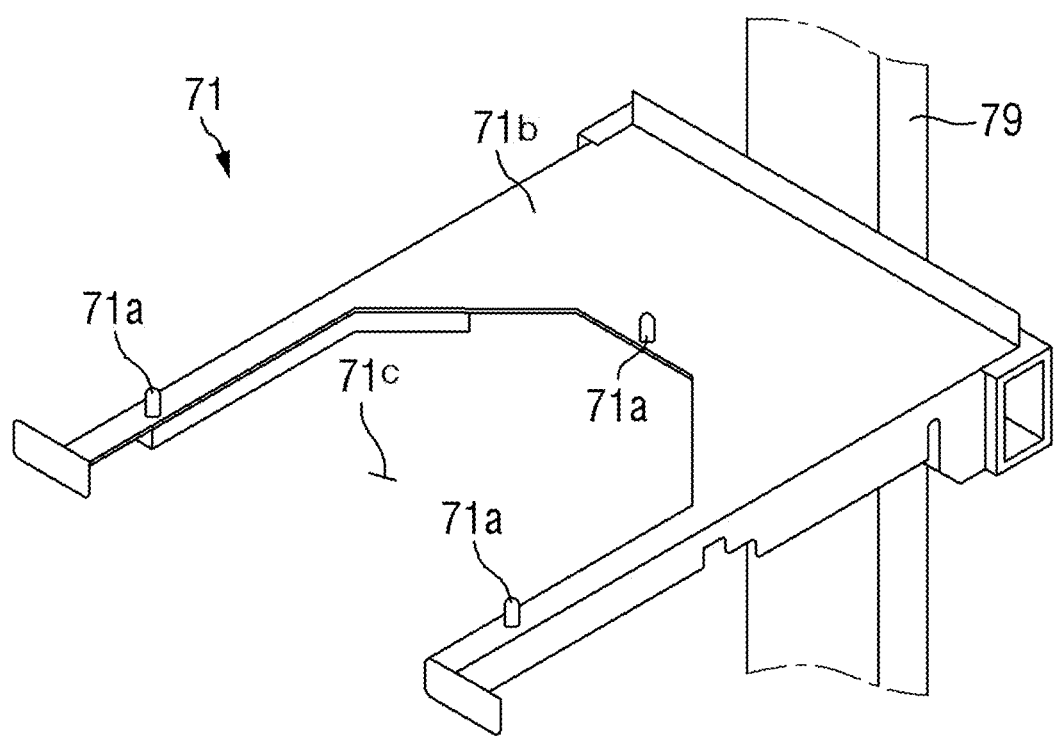
FIG. 3 is a view explaining an interface member of FIG. 1.
Figure 4:
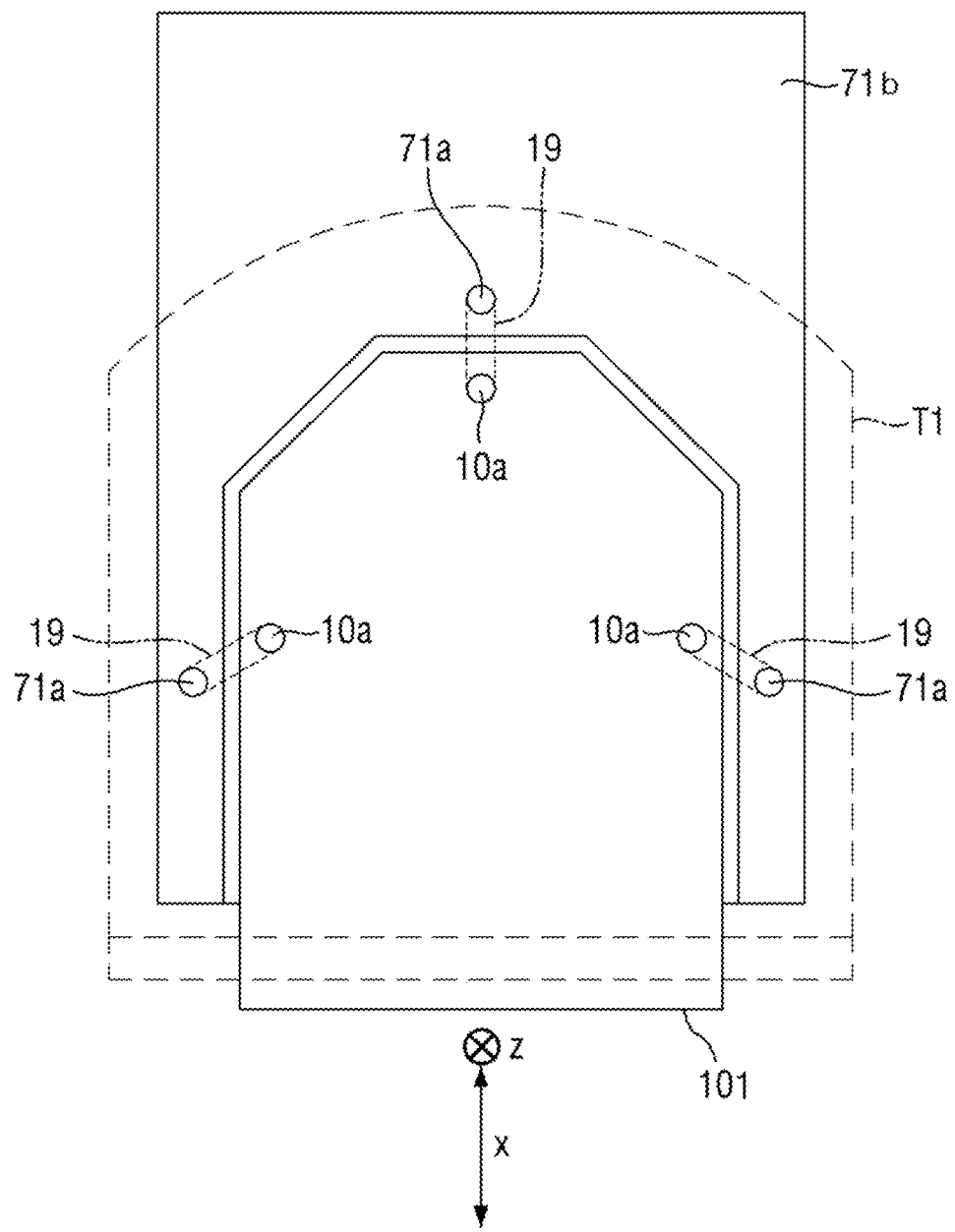
FIG. 4 is a view explaining a position relationship between a first transport plate, a first support plate, and a first-class article when the first transport plate transmits the first-class article.

FIG. 2 is a view explaining an operation of the first transport mounting portion of the tower lifter of FIG. 1. FIG. 3 is a view explaining the interface member of FIG. 1. FIG. 4 is a view explaining a position relationship between the first transport plate, a first support plate, and the first-class article when the first transport plate transmits the first-class article.

First, referring to FIG. 2, the first transport plate 101 of the first transport mounting portion 10 supports the first-class article T1 from below. The first-class article T1 may be a wafer storage container. For example, a first engagement groove 19 (see FIG. 4) is formed on the bottom surface of the first-class article T1, and the first positioning pins 10a (see FIG. 4) of the first transport plate 101 fit in the first engagement groove 19 (see FIG. 4).

Then, the frame 80 moves in the z-direction to position the first transport plate 101 at a height corresponding to the first support 71.

Then, the first robot arm 15 extends in the x-direction to overlap the first transport plate 101 and the first support 71.

Then, the first-class article T1 disposed on the first transport plate 101 is transported to the first support 71.

Specifically, FIG. 3 illustrates the first support 71 installed on the pillar 79. The first support 71 includes a first support plate 71b and a plurality of fourth positioning pins 71a formed on the first support plate 71b. A groove 71c is formed in the first support plate 71b. Although this is not illustrated separately, the second support 72 and the third support 73 have substantially the same shape as the first support 71.

Referring to FIG. 4, the first transport plate 101 moves towards the groove 71c of the first support plate 71b (i.e., in the x-direction). During the movement, the height of the first transport plate 101 is slightly higher than that of the first support plate 71b. Then, the first transport plate 101 moves downwards so that it can intersect the first support plate 71b (i.e., in the z-direction) while the first transport plate 101 supports the first-class article T1. In this way, the plurality of fourth positioning pins 71a of the first support plate 71b fit in the first engagement groove 19 of the first-class article T1, and the plurality of first positioning pins 10a of the first transport plate 10 are removed from the first engagement groove 19. Accordingly, the first-class article T1 is transported from the first transport plate 10 to the first support plate 71b.

When the first-class article T1 disposed on the first support plate 71b is transported to the first transport plate 10, it operates as follows.

The first transport plate 101 moves towards the groove 71c of the first support plate 71b (i.e., in the x-direction). During the movement, the height of the first transport plate 101 is slightly lower than that of the first support plate 71b. This is meant to prevent the first transport plate 101 from colliding with the first-class article T1. Then, the first transport plate 101 moves upwards so that it can intersect the first support plate 71b (i.e., in the z-direction). In this way, the plurality of first positioning pins 10a of the first transport plate 101 fit in the first engagement groove 19 of the first-class article T1, and the plurality of fourth positioning pins 71a of the first support plate 71b are removed from the first engagement groove 19. Accordingly, the first-class article T1 is transported from the first support plate 71b to the first transport plate 10.

Figure 5:
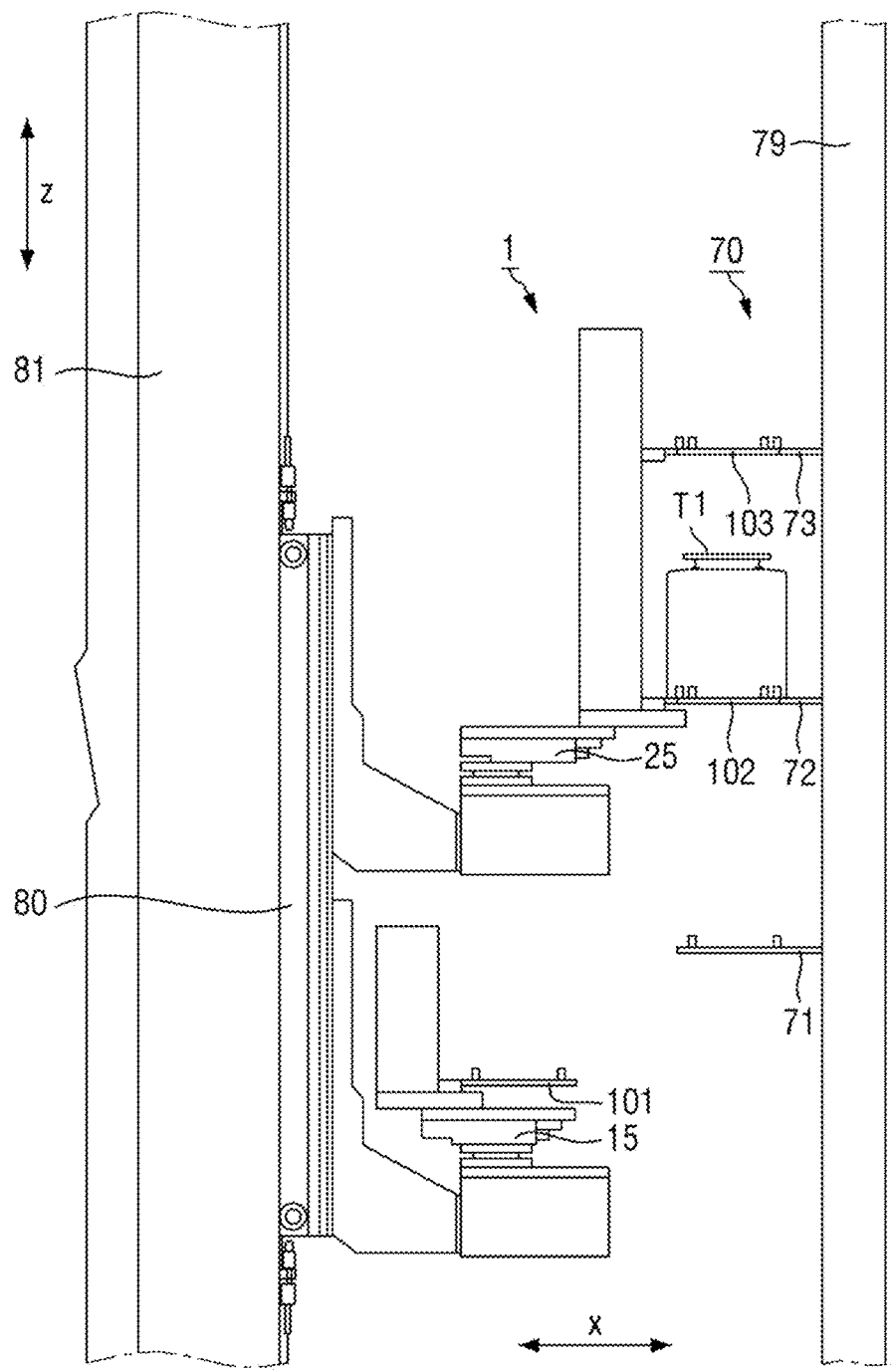
FIGS. 5 to 7 are views explaining an operation of a second transport mounting portion of the tower lifter of FIG. 1.
Figure 6:
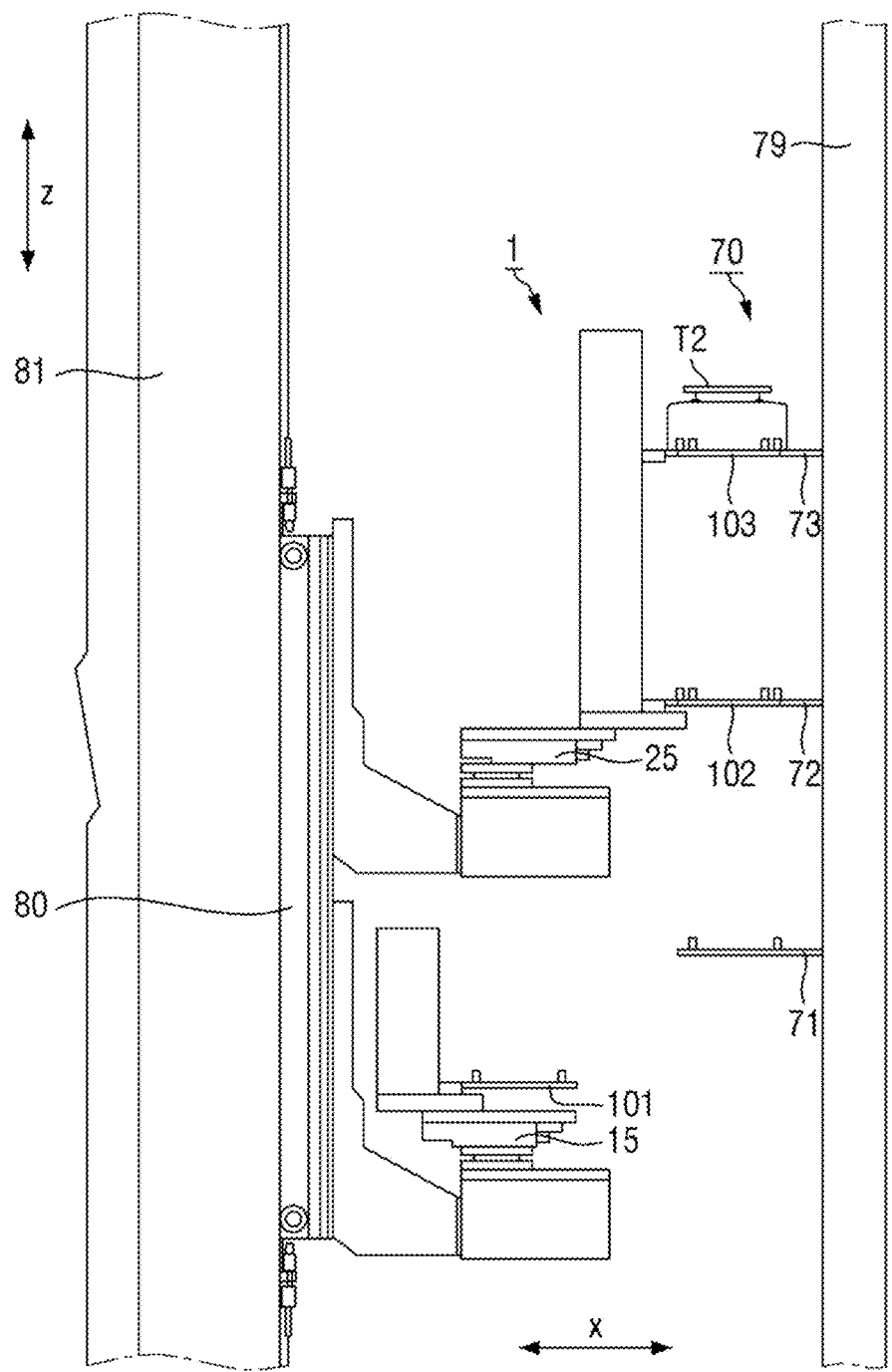
Figure 7:
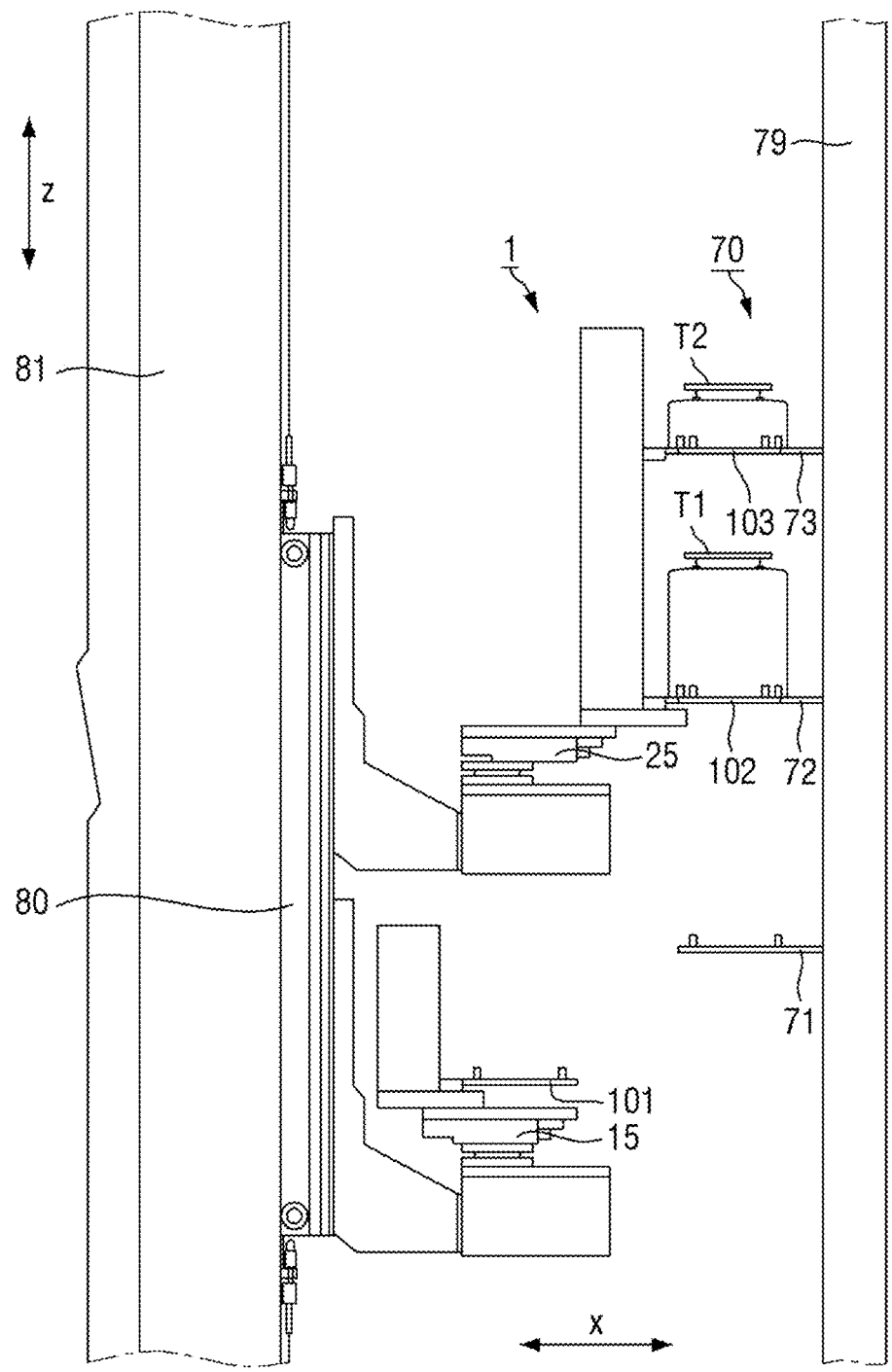

FIGS. 5 to 7 are views explaining an operation of the second transport mounting portion of the tower lifter of FIG. 1.

Referring to FIG. 5, the second transport plate 102 of the second transport mounting portion 20 supports the first-class article T1 from below, while the third transport plate 103 is empty.

Then, the frame 80 moves in the z-direction to position the second transport plate 102 at a height corresponding to the second support 72.

Then, the second robot arm 25 extends in the x-direction to overlap the second transport plate 102 and the second support 72.

Then, the first-class article T1 disposed on the second transport plate 102 is transported to the second support 72.

Referring to FIG. 6, the third transport plate 103 of the second transport mounting portion 20 supports the second-class article T2 from below, while the second transport plate 102 is empty. The second-class article T2 may be a reticle storage container. For example, a second engagement groove is formed on the bottom surface of the second-class article T2, and the third positioning pins of the third transport plate 103 fit in the second engagement groove.

Then, the frame 80 moves in the z-direction to position the third transport plate 103 at a height corresponding to the third support 73.

Then, the second robot arm 25 extends in the x-direction to overlap the third transport plate 103 and the third support 73.

Then, the second-class article T2 disposed on the third transport plate 103 is transported to the third support 73.

Specifically, the third transport plate 103 moves towards the groove (i.e., in the x-direction) of the third support plate of the third support 73. During the movement, the height of the third transport plate 103 is slightly higher than that of the third support plate. Then, the third transport plate moves downwards so that it can intersect the third support plate (i.e., in the z-direction) while the third transport plate supports the second-class article T2. In this way, a plurality of fifth positioning pins of the third support plate fit in the second engagement groove of the second-class article T2, and the plurality of third positioning pins of the third transport plate are removed from the second engagement groove. Accordingly, the second-class article T2 is transported from the third transport plate to the third support plate.

When the second-class article T2 disposed on the third support plate is transported to the third transport plate 103, it operates as follows.

The third transport plate 103 moves towards the groove of the third support plate (i.e., in the x-direction). During the movement, the height of the third transport plate 103 is slightly lower than that of the third support plate. This is meant to prevent the third transport plate 103 from colliding with the second-class article T2. Then, the third transport plate 103 moves upwards so that it can intersect the third support plate (i.e., in the z-direction). In this way, the plurality of third positioning pins 30a of the third transport plate 103 fit in the second engagement groove of the second-class article T2, and the plurality of fifth positioning pins of the third support plate are removed from the second engagement groove. Accordingly, the second-class article T2 is transported from the third support plate to the third transport plate 103.

Referring to FIG. 7, the second transport plate 102 of the second transport mounting portion 20 supports the first-class article T1 from below, and the third transport plate 103 supports the second-class article T2 from below.

Then, the frame 80 moves in the z-direction to position the second transport plate 102 at a height corresponding to the second support 72 and position the third transport plate 103 at a height corresponding to the third support 73.

Then, the second robot arm 25 extends in the x-direction to overlap the second transport plate 102 and the second support 72 and overlap the third transport plate 103 and the third support 73.

Then, the first-class article T1 disposed on the second transport plate 102 is transported to the second support 72, and the second-class article T2 disposed on the third transport plate 103 is transported to the third support 73.

Figure 8:
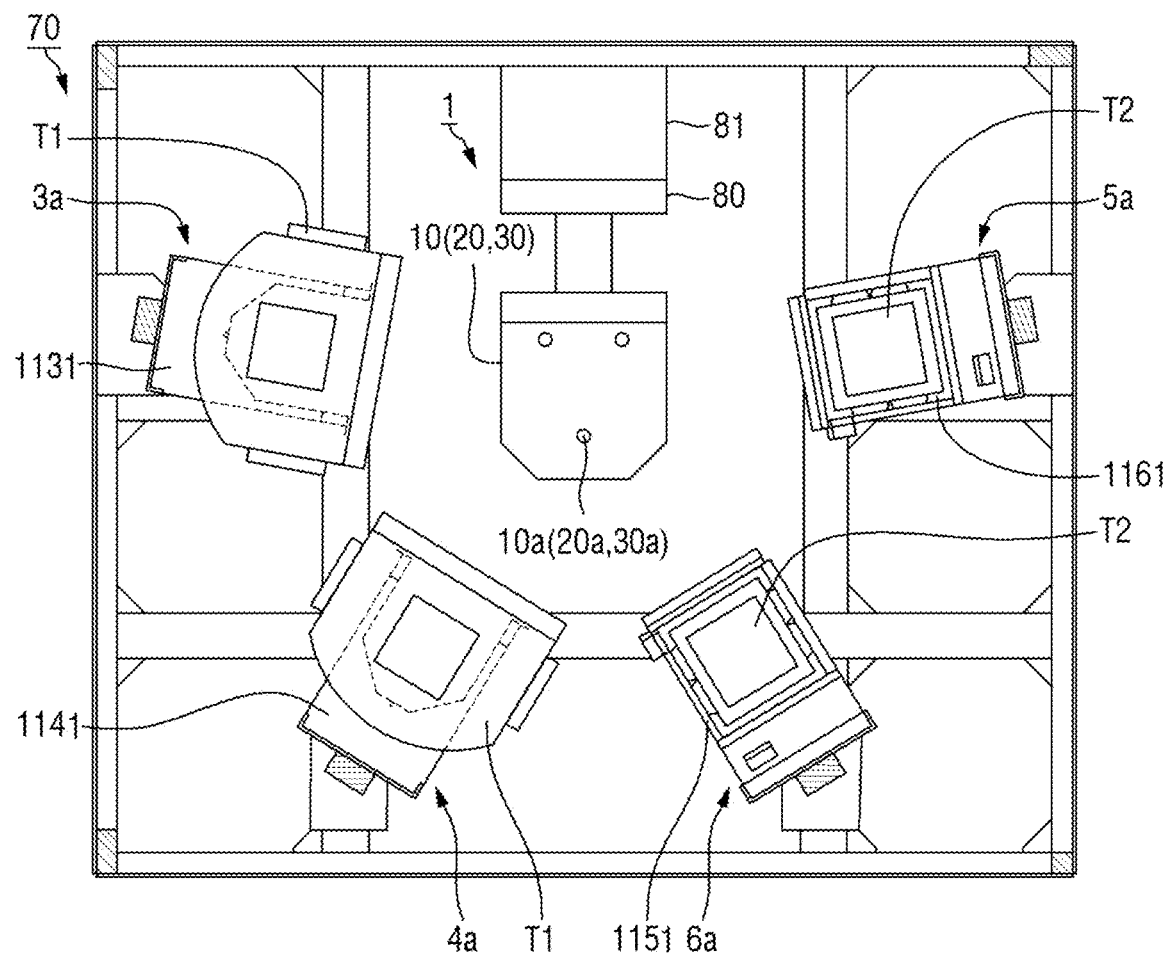
FIG. 8 is a top plan view explaining the apparatus for transporting articles according to one embodiment of the present disclosure.
Figure 9:
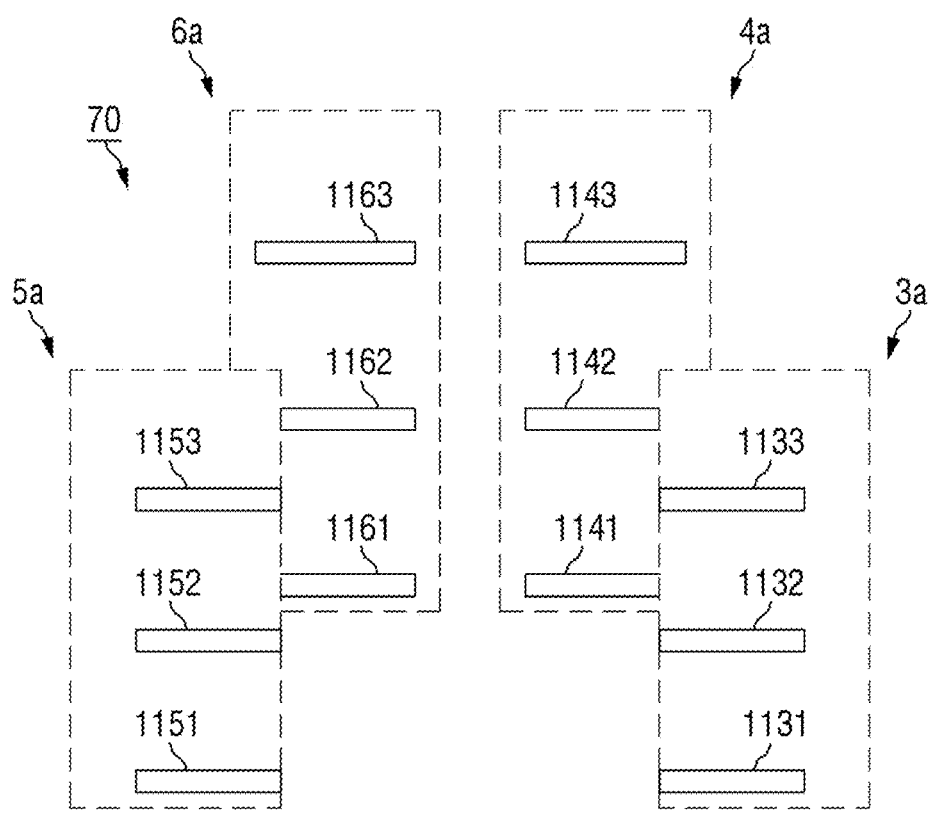
FIG. 9 is a view explaining the configuration of an interface member of FIG. 8.

FIG. 8 is a top plan view explaining the apparatus for transporting articles according to one embodiment of the present disclosure. FIG. 9 is a view explaining the configuration of an interface member of FIG. 8.

Referring to FIG. 8, the guide rail 81 extends in the vertical direction, and the frame 80 may move along the guide rail 81. The frame 80 is equipped with the first transport mounting portion 10, the second transport mounting portion 20, and the third transport mounting portion 30. The positioning pins 10a, 20a and 30a are installed on each of the first transport mounting portion 10, the second transport mounting portion 20, and the third transport mounting portion 30.

The interface member 70 includes a plurality of supporting constructions 3a, 4a, 5a and 6a. As illustrated in FIG. 8, the supporting constructions 3a, 4a, 5a and 6a may be disposed to surround the periphery of the tower lifter 1. The first supporting construction 3a includes supports 1131, 1132 and 1133 disposed in the vertical direction, the second supporting construction 4a includes supports 1141, 1142 and 1143 disposed in the vertical direction, the third supporting construction 5a includes supports 1151, 1152 and 1153 disposed in the vertical direction, and the fourth supporting construction 6a includes supports 1161, 1162 and 1163 disposed in the vertical direction. Although it is illustrated that each of the supporting construction 3a, 4a, 5a and 6a includes three supports, the present disclosure is not limited thereto. Furthermore, it is illustrated that four supporting constructions 3a, 4a, 5a and 6a are disposed in the periphery of the tower lifter 1, but the present disclosure is not limited thereto. Two, three, five, or more supporting constructions may be disposed.

FIG. 8 illustrates that the supporting constructions 3a and 4a are meant to store the first-class article T1, and the other supporting constructions 5a and 6a are meant to store the second-class article T2, but the present disclosure is not limited thereto. For example, in FIG. 9, the supports 1131, 1132, 1141, 1142, 1151, 1152, 1161 and 1162 disposed on first and second floors may store the first-class article T1, and the supports 1133, 1143, 1153 and 1163 disposed on a third floor may store the second-class article T2.

According to the operation of the robot arms 15 and 25 (see FIG. 1), the tower lifter 1 provides the first-class article T1 or the second-class article T2 to predetermined supports of the supporting constructions 3a, 4a, 5a and 6a. Conversely, the tower lifter 1 may pick up the first-class article T1 or the second-class article T2 from the predetermined supports of the supporting constructions 3a, 4a, 5a and 6a according to the operation of the robot arms 15 and 25 (see FIG. 1).

Figure 10:
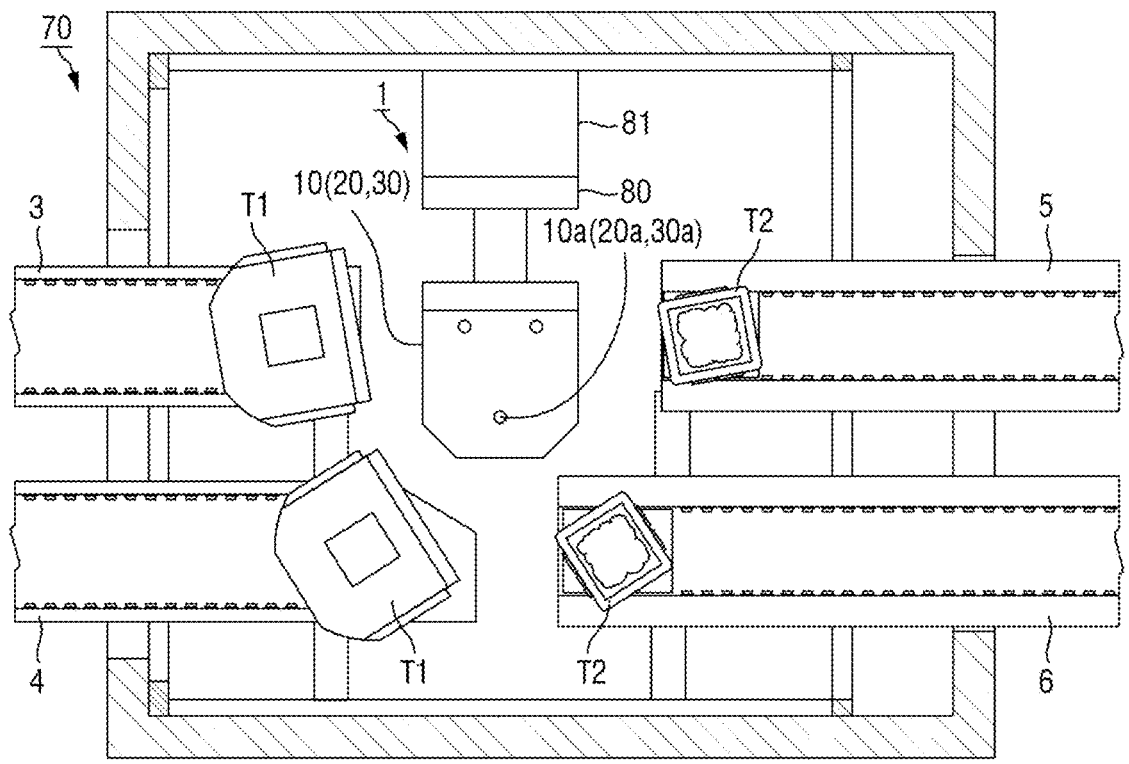
FIG. 10 is a top plan view explaining the apparatus for transporting articles according to another embodiment of the present disclosure.

FIG. 10 is a top plan view explaining the apparatus for transporting articles according to another embodiment of the present disclosure. For convenience of explanation, the differences from the content described with reference to FIG. 8 will be mainly described.

Referring to FIG. 10, the interface member 70 includes a plurality of supporting constructions 3, 4, 5 and 6. Each of the supporting constructions 3, 4, 5 and 6 may be in the form of a conveyor. For example, the supporting constructions 3 and 4 may move the first-class article T1 to a preset position, while other supporting constructions 5 and 6 may move the second-class article T2 to another preset position. Each of the supporting construction 3, 4, 5 and 6 may be formed of a conveyor arranged in multiple layers.

FIG. 11 is a flowchart explaining a method for transporting articles according to some embodiments of the present disclosure.

Referring to FIGS. 1 and 11, the apparatus for transporting articles, including the tower lifter 1 and the interface member 70, is provided (S310).

Specifically, the tower lifter 1 includes the frame 80, the first transport mounting portion 10 installed on the frame 80 and configured to support the first-class article T1 from below, the first transport mounting portion 20 installed on the frame 80, disposed over the first transport mounting portion 10 and configured to support the first-class article T1 from below, and the third transport mounting portion 30 installed on the frame 80, disposed over the second transport mounting portion 20 and configured to support the second-class article T2 different from the first-class article T1 from below. Furthermore, the second transport mounting portion 20 and the third transport mounting portion 30 operate simultaneously.

The interface member 70 includes the first support 71, the second support 72, and the third support 73.

Then, referring to FIGS. 2 and 11, the first transport mounting portion 10 supports the first-class article T1 from below and performs the in-out operation to settle the first-class article T1 on the first support 71 (S320).

Then, referring to FIGS. 6 and 11, the third transport mounting portion 30 performs the in-out operation to support the second-class article T2 different from the first-class article T1 from below and settle the second-class article T2 on the third support 73 (S330).

The time required for the first transport mounting portion 10 to perform the in-out operation may be identical to the time required for the third transport mounting portion 30 to perform the in-out operation.

As described above, since the first transport mounting portion 10, the second transport mounting portion 20, and the third transport mounting portion 30 support and move the container from below without holding and moving the lid of the container, the first transport mounting portion 10, the second transport mounting portion 20, and the third transport mounting portion 30 may have the same time for the in-out operation.

Although the embodiments of the present disclosure have been described above with reference to the accompanying drawings, the present disclosure is not limited to the disclosed embodiments, but may be implemented in various different ways, and the present disclosure may be embodied in many different forms without changing technical subject matters and essential features as will be understood by those skilled in the art. Therefore, embodiments set forth herein are exemplary only and not to be construed as a limitation.

What is claimed is:

1. An apparatus for transporting articles, the apparatus comprising:
   a frame;
   a first transport mounting portion connected to the frame and configured to support a first-class article from below;
   a second transport mounting portion connected to the frame, disposed over the first transport mounting portion and configured to support the first-class article from below;
   a third transport mounting portion connected to the frame, disposed over the second transport mounting portion and configured to support a second-class article different from the first-class article from below;
   a second support configured to load the first-class article; and
   a third support configured to load the second-class article, wherein the third support is disposed over the second support,
   wherein the first transport mounting portion operates independently of the second and third transport mounting portions, and the second transport mounting portion and the third transport mounting portion operate simultaneously.

2. The apparatus for transporting articles of claim 1, wherein the frame moves in the vertical direction, and
   when viewed in the vertical direction, the first transport mounting portion, the second transport mounting portion, and the third transport mounting portion are installed to overlap with each other.

3. The apparatus for transporting articles of claim 1, wherein the second transport mounting portion supports the first-class article, and the third transport mounting portion is empty, and
   each of the second transport mounting portion and the third transport mounting portion extends towards the second support and the third support, and the second transport mounting portion transports the first-class article to the second support.

4. The apparatus for transporting articles of claim 1, wherein the second transport mounting portion is empty, and the third transport mounting portion supports the second-class article, and
   each of the second transport mounting portion and the third transport mounting portion extends towards the second support and the third support, and the third transport mounting portion transports the second-class article to the third support.

5. The apparatus for transporting articles of claim 1, wherein the second transport mounting portion supports the first-class article, and the third transport mounting portion supports the second-class article, and
   each of the second transport mounting portion and the third transport mounting portion extends towards the second support and the third support, and the second transport mounting portion transports the first-class article to the second support and the third transport mounting portion transports the second-class article to the third support.

6. The apparatus for transporting articles of claim 1, wherein the time required for the first transport mounting portion to perform an in-out operation of settling the first-class article on a first support is identical to the time required for the third transport mounting portion to perform an in-out operation of settling the second-class article on the third support.

7. The apparatus for transporting articles of claim 1, wherein the first transport mounting portion is operated by a first robot arm connected to the frame, and
   the second transport mounting portion and the third transport mounting portion are operated by a second robot arm connected to the frame.

8. The apparatus for transporting articles of claim 1, wherein the second transport mounting portion includes a first transport plate and a plurality of first positioning pins disposed on the first transport plate,
   the second support includes a first support plate and a plurality of second positioning pins disposed on the first support plate, and
   a first engagement groove in which the first positioning pins and the second positioning pins fit is formed on a bottom surface of the first-class article.

9. The apparatus for transporting articles of claim 1, wherein the third transport mounting portion includes a second transport plate and a plurality of third positioning pins disposed on the second transport plate, the third support includes a second support plate and a plurality of fourth positioning pins disposed on the second support plate, and a second engagement groove in which the third positioning pins and the fourth positioning pins fit is formed on a bottom surface of the second-class article.

10. The apparatus for transporting articles of claim 1, wherein the first-class article is a wafer storage container, and the second-class article is a reticle storage container.

11. An apparatus for transporting articles, the apparatus comprising:

a tower lifter configured to transport the article;

an interface member configured to receive the article from the tower lifter and store the article or transport the article to another position, wherein the tower lifter comprises:

a frame configured to move in the vertical direction;

a robot arm connected to the frame;

a first transport mounting portion connected to the robot arm and configured to support a first-class article from below; and a second transport mounting portion connected to the robot arm, disposed over the first transport mounting portion and configured to support a second-class article different from the first-class article from below, wherein, when viewed in the vertical direction, the first transport mounting portion and the second transport mounting portion are installed to overlap with each other, the first transport mounting portion and the second transport mounting portion operate simultaneously according to the operation of the robot arm, and the interface member comprises a second support configured to load the first-class article and a third support configured to load the second-class article, and the third support is disposed over the second support.

12. The apparatus for transporting articles of claim 11, wherein the first transport mounting portion includes a first transport plate and a plurality of first positioning pins disposed on the first transport plate, the interface member further comprises a first support configured to load the first-class article, and the first support includes a first support plate and a plurality of second positioning pins disposed on the first support plate, and wherein a first engagement groove in which the first positioning pins and the second positioning pins fit is formed on a bottom surface of the first-class article.

13. The apparatus for transporting articles of claim 11, wherein the second transport mounting portion includes a second transport plate and a plurality of third positioning pins disposed on the second transport plate, and the second support includes a second support plate and a plurality of fourth positioning pins disposed on the second support plate, and wherein a second engagement groove in which the third positioning pins and the fourth positioning pins fit is formed on a bottom surface of the second-class article.

14. The apparatus for transporting articles of claim 11, wherein the first-class article is a wafer storage container, and the second-class article is a reticle storage container.

15. A method for transporting articles, the method comprising:

providing an apparatus for transporting articles, wherein the apparatus comprises: a frame; a first transport mounting portion connected to the frame and configured to support a first-class article from below; a second transport mounting portion connected to the frame, disposed over the first transport mounting portion and configured to support the first-class article from below; and a third transport mounting portion connected to the frame, disposed over the second transport mounting portion and configured to support a second-class article different from the first-class article from below, and further comprises: a tower lift configured to simultaneously operate the first transport mounting portion and the second transport mounting portion; and an interface member including a first support, a second support configured to load the first-class article and a third support configured to load the second-class article, wherein the third support is disposed over the second support;

performing an in-out operation to support the first-class article from below and settle the first-class article on the first support by the first transport mounting portion; and performing the in-out operation to support the second-class article different from the first-class article from below and settle the second-class article on the third support by the third transport mounting portion.

16. The method for transporting articles of claim 15, wherein the time required to perform an in-out operation of the first transport mounting portion is identical to the time required to perform an in-out operation of the third transport mounting portion.

17. The method for transporting articles of claim 15, wherein the third transport mounting portion performs the in-out operation while the second transport mounting portion is empty.

18. The method for transporting articles of claim 15, wherein the first-class article is a wafer storage container, and the second-class article is a reticle storage container.

19. The apparatus for transporting articles of claim 1, wherein the second support and the third support are arranged at a same direction as each other.

20. The method for transporting articles of claim 15, further comprising, by the second support and the third support, loading the first-class article and the second-class article at a same direction as each other, respectively.

* * * * *